United States Patent
Keith, Jr.

[15] 3,677,405
[45] July 18, 1972

[54] LIQUID AND SLUDGE TREATMENT

[72] Inventor: Frederick Walter Keith, Jr., Gladwyne, Pa.

[73] Assignee: Pennwalt Corporation, Philadelphia, Pa.

[22] Filed: Sept. 25, 1970

[21] Appl. No.: 75,421

[52] U.S. Cl..................................210/71, 62/58, 210/73, 210/84, 210/181, 210/197, 210/202
[51] Int. Cl..........................................B01d 21/26
[58] Field of Search.........................210/71–73, 84, 210/181, 195, 197, 202, 512 M; 62/58

[56] References Cited

UNITED STATES PATENTS

| 3,577,341 | 5/1971 | Keith, Jr. et al. | 210/202 |
| 3,350,297 | 10/1967 | Torobin | 62/58 X |
| 1,764,390 | 6/1930 | Cleary | 210/71 |
| 3,248,323 | 4/1966 | Albertson | 210/195 X |
| 3,297,532 | 1/1967 | Jones | 210/71 X |
| 3,350,296 | 10/1967 | Torobin | 62/58 X |

*Primary Examiner*—John Adee
*Attorney*—Carl A. Hechmer, Jr. and Earl T. Reichert

[57] ABSTRACT

In water or liquid treatment, settled soft sludge is subjected to a first centrifugation to obtain cleaned water or liquid, and a concentrated aqueous sludge. This aqueous sludge is then continually fed through a freezing zone, and a thawing zone, after which it is subjected to a second centrifugation to obtain concentrated solids which are highly suitable for land fill, and further cleaned water or liquid which may be reprocessed.

20 Claims, 1 Drawing Figure

Patented July 18, 1972
3,677,405
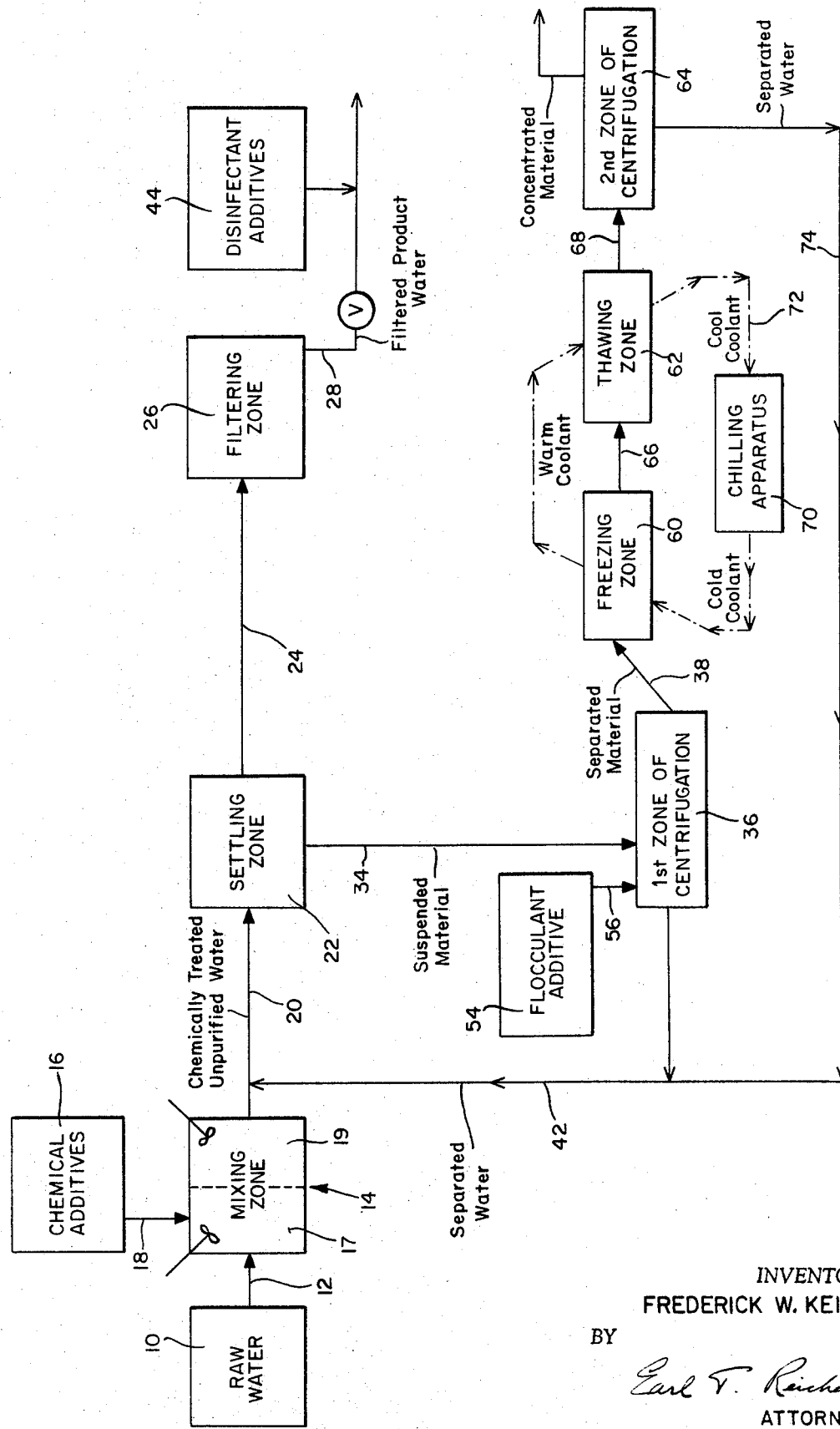
INVENTOR.
FREDERICK W. KEITH, JR
BY
Earl T. Reichert
ATTORNEY.

LIQUID AND SLUDGE TREATMENT

BACKGROUND OF THE INVENTION

This invention relates to a method and apparatus for treating liquid (such as raw water) to obtain the sedimentation of soft sludge therefrom, and to handling the soft sludge in such a manner as to obtain concentrated solids, and cleaned liquid therefrom. Although the invention is discussed with respect to the treatment of raw water, the invention is equally applicable to the treatment of raw liquids in general, and to the handling of soft sludges in general.

In many localities, it has been the practice of water purifying plants to extract water from a water course, treating it and returning removed and manufactured impurities to the water course at a downstream location. Such practices have been accepted in the past, on the theory that the water treatment plant has merely removed some pure water for the public good. In actuality, downstream riparians receive water with an increased concentration of impurities, partly due to the return of impurities, and partly because of the addition of such additives as carbon and alum during processing. In densely populated areas especially, greater attention is now being given to pollution problems and some existing water treatment plants are being required to discontinue the practice of discharging large volumes of process waste into water courses.

In the above mentioned co-pending application, in addition to retaining the conventional steps and apparatus for mixing chemical additives into the raw water, obtaining sedimented material from the mixture, and filtering the separated water prior to distribution, the sedimented material (soft sludge) is subjected to centrifugation to obtain concentrated aqueous sludge and cleaned water therefrom. While this concentrated aqueous sludge is much improved as compared to the original soft sludge coming from the gravity settling zone, and can be more conveniently and economically disposed of, it is still a plastic material that can present problems if used as land fill. When used as land fill, the concentrated aqueous sludge obtained by centrifugation, and the previous soft sludges are not dry enough to be satisfactory; used as land fill, these sludges dry on top of but not below the ground, thus providing poor ground support.

SUMMARY OF THE PRESENT INVENTION

According to the present invention, the steps and apparatus for mixing chemical additives into the raw water, sedimenting material from the mixture, filtering the separated water prior to distribution, and subjecting the sedimented material (soft sludge) to centrifugation are retained; however, the concentrated aqueous sludge obtained from the centrifugation is now continually fed through a freezing zone to completely freeze the same, and then through a thawing zone to completely thaw the same. After, thawing, the solids in the sludge change form, and are more densely coagulated; the insoluble solid particles, now existing in a form much more amenable to compaction are subjected to a second centrifugation for final deliquefying to obtain concentrated solids which are highly suitable for land fill, and further cleaned liquid. This further cleaned liquid may be recovered for reprocessing.

DETAILED DESCRIPTION OF INVENTION

An example of the practice of the invention will now be described in connection with the accompanying drawing, in which the single illustration is a schematic view of a plant for use in carrying out the process.

Referring to the drawing, a river, stream or water course provides a source 10 of raw water which is delivered through a line 12 to a mixing zone 14. In the mixing zone 14 pre-chemical treatment of the raw water is accomplished by the introduction thereto of one or more chemical additives from tank 16 through a line 18. Although not shown, a separate tank 16, line 18, and suitable metering valves may be provided for each chemical additive to be so introduced.

The chemicals added to the raw water are suited for the correction of such deficiencies as turbidity, dissolved or soluble impurities, taste, odor, color, bacteria, hardness, acidity, alkalinity, pH, and miscellaneous substances. The additives usually comprise one or more chemicals from the group consisting of potassium permanganate, aluminum sulfate, ferric sulfate, lime, carbon, chlorine, ammonia, sodium hydroxide, and soda ash.

Various chemicals will combine with water or the constituents present therein to produce a flocculent or gelatinous precipitate which aids clarification during sedimentation. During formation and settling of floc, many finely divided suspended particles, including microorganisms, are collected and some of the dissolved substances, particularly those that impart color, are absorbed. Of the chemicals used for this purpose, aluminum sulfate (alum) is employed most extensively, the amounts used in practice varying from less than one grain to approximately five grains per gallon. Ferric salts are acceptable substitutes, especially if the pH of the water is not suitable for alum coagulation. Both aluminum and iron form gelatinous precipitates, and the extent to which these added salts participate in the precipitation will depend to a large extent upon the pH of the water. Since the amount of precipitate and the efficiency of removal of suspended matter are dependent upon a favorable pH, it is often possible to improve the effectiveness of the alum treatment by prior adjustment of pH.

In some places it has been found desirable to prechlorinate the water before adding the coagulating chemicals so as to kill some of the organisms that may be responsible for taste and odors. The killed organisms are more easily removed by the coagulating chemicals than the live ones, and if they are not removed in the settling tanks with the floc, they will be carried on to the filters where they get caught by the filters and eventually die and disintegrate, and liberate the compounds responsible for the taste and odors.

Activated carbon has been found to be an effective agent for removal of taste and odors as well as color, and in some communities it has been found desirable to add activated carbon to the water for this purpose.

It is contemplated that within the mixing zone 14 there will be a first region 17 for the introduction and quick mixing of the chemical additives and also a second region 19 for the slow mixing of the chemicals under agitation in order to prevent settling and provide a suitable period of time for the desired chemical reaction.

The chemicals must be added to the water in the mixing zone 14 as it flows into the treatment plant, necessitating a continuous feed, proportioned to the flow of water. In some cases, each additive is dissolved in a small amount of water to give a strong solution and then fed into the raw water. In other cases, dry powders are mixed with incoming waters by proportioning machines. Immediately after chemicals have been added at region 17 there is a rapid or violent stirring, so as to mix the chemicals uniformly with the water. After this, the water enters region 19, where it remains for a period of from 15 to 20 minutes and where it is stirred slowly. During this slow agitation precipitate forms and increases in size. Slow mixing also permits the precipitate to pass through the water and to occlude more of the suspended matter and also absorb more of the dissolved substances. This agitation can be accomplished either by having the liquid flow through a narrow channel, over and under a series of baffles, or having it mixed in a rectangular tank by mechanical devices. If this period of mixing is not employed, a larger quantity of chemical has to be added to accomplish the desired results.

The chemically treated unpurified water is delivered from the mixing zone 14 by a line 20 to a settling zone 22 where gravitational separation or sedimentation of solids takes place. Separated water is withdrawn from an upper region of the settling zone 22 and conducted through a line 24 to a filtering zone 26, while suspended solids gravitate to a lower region of the settling zone 22.

More specifically, after the floc has formed and after the period of slow mixing in zone 14, the water is run via line 20 into the settling zone 22, i.e., settling basins where the precipitate can be allowed to settle. One of several types may be employed. One is an intermittent type which operates on a fill-and-draw basis, but a continuous type is now generally used in which the water flows through at a slow rate.

In the continuously operating basins, the water is run in at one location and allowed to pass slowly through the chamber and emerge from another location as clarified water. In many installations these basins are constructed so as to depend upon manual operation for the removal of the solids, which is done from time to time by taking the unit out of service, draining the water, draining and flushing the bottom, and cleaning the basin before putting it back into service. To facilitate such cleaning, the bottoms of the basins are generally constructed so that they slope toward the point where there are openings into the waste line 34. More modern settling basins are provided with mechanical scrapers that continually push the solids into sludge pits where they can be removed with pumps. The mechanized tanks have the advantage that they can be kept in continuous service, and are particularly desirable in installations where a large amount of sediment must be removed.

As mentioned previously, clarified water is delivered from the settling zone 22 or basin through a line 24 to a filtering zone 26 by gravity or by pumps (not shown). The filtering zone 26 may consist of filtering sand beds and/or in some instances a resin bed adapted to accomplish softening of hard water. The primary purpose of the filtering zone 26 is to effect final separation of impurities and to temporarily retain them in the bed, while filtered product water is discharged through a line 28.

The construction of the filtering zone 26 is preferably that of a rapid media filter, e.g., filter beds of sand, carbon, fine coal, limestone, ion exchange resins, synthetic plastic resins, etc. With rapid media filters it may not be possible to obtain adequate clarification by filtration alone, and therefore prior treatment with coagulants is desirable. Here, also it is preferable to leave some of the precipitate in the water as it enters the filters in order to build up a film on the surface of the media to aid in the removal of suspended matter and bacteria.

In a single plant there will be many of these individual units comprising the filtering zone 26, so constructed and arranged that any one unit can be taken out of service without interfering with the operation of the others. The removal of bacteria by the rapid media filter is effective and efficient with proper coagulation preceding the filtration.

Since filters cannot be depended upon to remove all the pathogenic organisms that might be present, it is necessary as an extra safeguard to introduce some disinfectant into the water after it emerges from the filtering zone 26 and before it is put into the distribution system. The available and permissible disinfectants are chlorine, hypochlorite, ozone, and ultraviolet light. Chlorine is the agent used, in most plants in the form of a strong solution of chlorine in water, which has been produced in chlorinators that dissolve gaseous chlorine in the proper proportions. As shown in the drawing, this solution is added from a tank 44 to line 28 as the water emerges from the filter zone 26. The gaseous chlorine in turn is obtained from liquid chlorine in cylinders or tank cars. Time is required for the chlorine to kill the pathogenic bacteria, and, therefore, it is desirable to retain the water in reservoirs (not shown) for a period of time before it is pumped into the distribution system. The quantity of chlorine required will vary from time to time, depending upon the nature of the water, the amount of organic matter present, and the residual that needs to be maintained.

In a conventional water purification plant suspended material or soft sludge taken from the bottom of settling zone 22 by a line 34 is discharged into the water course at a downstream location. As indicated previously, however, such practice pollutes the water course downstream of the water purification plant to the dissatisfaction of downstream water users.

According to the present invention, an aqueous solution or suspension of removed material from the settling zone 22 is fed from the waste line 34 to a first zone of centrifugation 36, the latter being also referred to herein as a locus of centrifugal force. This feed from the bottom of the settling zone 22 is subjected to centrifugation in the zone 36 preferably by forces ranging between 900 and 3000 times the force of gravity, as a result of which it is separated into an inner layer comprising cleaned water and also an outer layer comprising a separated material herein referred to as a concentrated aqueous sludge.

The cleaned, separated water is also separately discharged, from the inner layer of the zone of centrifugation 36, and preferably passed through line 42 into line 20 ahead of the settling zone 22 for recycling therethrough, although discharge to a downstream location is an alternative contemplated by this invention for some water treatment plants. The cleaned, separated water has typically 95 percent of the suspended solids removed therefrom by centrifugation and it constitutes the major portion of the fluid discharged from the centrifugation zone 36. This cleaned, separated water which is recycled is a large percentage of the volume of feed delivered to the centrifugation zone 36 by line 34, and would otherwise be discharged with the undesired material in conventional or other processes.

As an option, a polyelectrolyte material or other suitable flocculent may be introduced to the zone of centrifugation 36 from a tank 54 through a tube 56 in order to increase the rate of solids recovery from the feed. With this provision the rate of recovery can be increased from about 95 percent to approximately 98 percent.

Although the invention is not so limited, a suitable centrifuge for carrying out the present invention is of the basket type shown and described in the co-pending application of William J. Kirkpatrick, Ser. No. 593,338, filed Nov. 10, 1966, now U.S. Pat. No. 3,407,999, granted Oct. 29, 1968 and assigned to the assignee of the present invention. This type of centrifuge preferably includes an imperforate centrifuge bowl mounted for rotation about a vertical axis, with means for introducing the feed to the bowl, although a perforated bowl can be used for some applications. During rotation of the bowl, clarified liquid flows over an annular lip at one end, e.g., the upper end, of the bowl, while solids build up on the peripheral wall of the bowl. When solids are accumulated to a predetermined level a non-rotating skimmer tube is actuated either manually or automatically for outward movement whereby the flowable solids enter the mount of the tube and are discharged from the bowl through the tube. A knife which is movable in a manner similar to the tube may be employed for shaving compacted solids from the extreme periphery of the bowl at low speed, and the shavings may be discharged through an axial opening at the bottom of the bowl. The invention partly involves a new use for apparatus of this general type.

Although the invention is not so limited, the concentrated aqueous sludge obtained from the first zone of centrifugation 36 is then subjected to a continual freezing and thawing, preferably as disclosed in U. S. Pat. No. 3,294,672, or U. S. Pat. No. 3,350,296. After passing through the first zone of centrifugation 36, the concentration of the aqueous sludge is frequently five to ten times that of the incoming feed (soft sludge) introduced through line 34; for example the incoming soft sludge might typically be 0.5 to 2.5 percent by weight insoluble solids whereas the aqueous sludge passing through line 38 would be 5-15 percent by weight insoluble solids. To render a continual freezing and thawing process feasible, it is necessary to continually pass the soft sludge through a first zone of centrifugation 36 because of the initial high volume flow rate; however, after an approximately ten-fold concentration in zone 36, the volume flow rate is relatively small. For example, typical flow rates would be as follows: If the raw water flow rate to settling zone 22 were 30 million gallons per day, the flow rate of soft sludge through line 34 would be between 30 and 60 gallons per minute. After approximately a ten-fold increase in concentration in zone 36, the flow rate of aqueous sludge through line 38 would be between three and six gallons per minute. The centrifuge used in zone 36 is preferably a basket type as discussed above, a disc type, or in some cases, a scroll conveyor centrifuge.

The aqueous sludge from zone 36, being plastic, is continually fed or delivered through line 38 (via a pump or other suitable means not shown) to freezing zone 60 where it is completely frozen; the frozen aqueous sludge is then continually fed through line 66 and thawing zone 62 to completely thaw the same, after which the thawed aqueous sludge is continually discharged through line 68.

A closed circuit 72 circulates coolant through freezing zone 60 to remove heat from, and freeze the aqueous sludge flowing therethrough, after which the warm coolant passes through thawing zone 60 to release heat to, and thaw the aqueous sludge passing therethrough. The cool coolant than passes from the thawing zone through a chilling apparatus 70 in order to reach the necessary low temperature for reintroduction as cold coolant into freezing zone 60.

When freezing and thawing the aqueous sludge as disclosed in the above cited patents, the aqueous sludge is introduced into the top of a first tower (freezing zone 60) through a spray head and dispersed as droplets into a continuous phase of an immiscible coolant which might typically be a petroleum distillate. The cold coolant is introduced into the bottom of the same tower as a stream which is approximately 5° to 15° colder than the freezing point of the incoming aqueous sludge; the tower is filled with the coolant as a continuous phase. The dispersed aqueous sludge drops through the coolant due to a difference in density, and loses heat to the coolant; with appropriate design of the tower, and control of the flow rates, and aqueous sludge particles are completely frozen by the time they reach the bottom of the tower. The coolant passes upwardly through the tower, and is warmed to within 5° to 15° of the incoming aqueous sludge before it passes out the top of the tower.

The frozen sludge is then conveyed via a screw conveyor, or other suitable means, from the bottom of the first tower to the top of a second tower (thawing zone 62) where the frozen particles are again dispersed in an immiscible continuous phase. The continuous phase in this second tower consists of the warm coolant from the top of the first tower plus, if necessary, additional warm coolant from storage; the warm coolant is introduced at the bottom of the second tower, and passes upwardly counter-current to the descending frozen particles of aqueous sludge. In so doing, the continuous phase warms the dispersed particles of frozen aqueous sludge which reach the bottom of the second tower in a thawed or unfrozen condition, and coalesce in a layer, while the continuous phase is removed from the top of the second tower as cool coolant. It may then be necessary to circulate the cool coolant through means (chilling apparatus 70) to further chill the coolant before reintroduction as cold coolant into the bottom of the first tower.

The thawed aqueous sludge is then continually passed from thawing zone 62, through line 68, and into a second zone of centrifugation 64. A suitable centrifuge for carrying out the separation process in the second zone of centrifugation is of the basket type as set forth in the above mentioned co-pending application of William J. Kirkpatrick. For certain sludges having relatively sturdy particles, a scroll conveyor centrifuge is also satisfactory. Thawed aqueous sludge within the second zone of centrifugation 64 is subjected to forces ranging between 600 and 3000 times the force of gravity; as a result this thawed aqueous sludge is separated into an inner layer comprising further cleaned water, and an outer layer of concentrated material. This outer layer of concentrated material is comprised of highly concentrated or deliquefied solids hereinafter referred to as concentrated solids. The further cleaned water is recycled back through line 74 for reprocessing. Although illustrated as being recycled back to line 20 immediately ahead of settling zone 22, it is also possible to recycle the further cleaned water back to line 34 ahead of zone 36. The concentrated solids have a marked increase in solids concentration as compared to the initial soft sludge passing through line 34; the volume of the concentrated material (concentrated solids) for disposal as land fill, as compared with the soft sludge passing through line 34 from settling zone 22, also shows a marked decrease. For example, when as stated above, soft sludge flow from settling zone 22 is between 30 and 60 gallons per minute, and consequently the flow rate through line 38 is between three and six gallons per minute, the flow rate of concentrated solids from the second zone of centrifugation 64 is typically less than one third of the input rate, or less than one to two gallons per minute.

While the discussion herein has been based on raw water treatment, and handling the sludge settling therefrom, it is equally applicable to activated sludges from biological waste treatment systems, or soft sludges in general.

The treatment set forth herein is continual from the introduction of raw liquid to the recovery of concentrated solids and further cleaned liquid from the second zone of centrifugation 64. This permits high economies in the energy required for freezing and thawing, simple and efficient operation, and the handling of very large as well as small flow volumes. Heat transfer rates to the dispersed aqueous sludge particles or droplets are high, and chilling is quiescent within the droplets. While the entire process is continual from beginning to end, the aqueous sludge can be conditioned by simply letting it remain in a frozen state in a bed in the bottom of the first tower, or in a thawed state in the bottom of the second tower; thawed sludge collecting in the bottom of the second tower can be passed directly (even by gravity) to the second zone of centrifugation 64 for concentration, and controlled speed cycles can be utilized for the centrifuge used in the latter if necessary to produce optimum deliquefying of the aqueous sludge.

Because there is a continuous flow path extending from source 10 to the second zone of centrifugation 64, the process is considered continual even though the materials being subjected to treatment may remain in residence within these zones for various periods of time. For example, the aqueous sludge may remain in the freezing or thawing zones for a predetermined period of time for conditioning as stated above; and one or more of the zones such as the zones of centrifugation may discharge intermittently or cyclically.

As stated above the aqueous sludge is completely frozen within zone 60. This means that the water within each individual sludge particle solidifys, and assumes a crystal form, the sludge particle being hard and rigid.

While the theory on the actual physical chemical change which occurs as a result of freezing the aqueous sludge particles is not completely understood, it is believed that as the sludge particle freezes, impurities are excluded from the water which then freezes into quite pure water crystals. Thus, the water in the sludge is collected in frozen crystals. Upon thawing, the dewatered particles do not have the same attraction for water that they originally had and remain in a more granular form.

What is claimed is:

1. A method for deliquefying soft sludge which comprises (a) continually feeding said soft sludge into a first zone of centrifugation, and there (b) separating it into an inner layer comprising cleaned liquid and an outer layer comprising concentrated aqueous sludge, and (c) continually separately discharging said cleaned liquid and said aqueous sludge, and (d) continually feeding said discharged aqueous sludge to a freezing zone to freeze the same, and then (e) continually feeding said frozen aqueous sludge from said freezing zone to a thawing zone to thaw the same.

2. A method according to claim 1 comprising continually feeding said thawed aqueous sludge from said thawing zone to a second zone of centrifugation, and there (a) separating the same into an inner layer comprising further cleaned liquid, and an outer layer comprising concentrated solids, and (b) continually separately discharging said further cleaned liquid and said concentrated solids.

3. A method according to claim 2, further including the step of recycling said further cleaned liquid from said second zone of centrifugation to a point ahead of said first zone of centrifugation.

4. A method according to claim 2, further including the step of continually circulating coolant through said freezing zone, and from said freezing zone through said thawing zone, and from said thawing zone back through said freezing zone, said coolant absorbing heat from said aqueous sludge in said freezing zone, and releasing heat to said aqueous sludge in said thawing zone.

5. A method according to claim 4, further including the step of continually feeding said aqueous sludge in the form of droplets through both said freezing zone, and said thawing zone in a direction countercurrent to the flow of said coolant through both said zones, said droplets directly contacting said coolant in both said zones, and said droplets being immiscible with said coolant.

6. A method according to claim 5, further including the step of recycling said further cleaned liquid discharged from said second zone of centrifugation to a point ahead of said first zone of centrifugation.

7. A method according to claim 5, further including the step circulating said coolant through a chilling zone after passing from said thawing zone, and before entering said freezing zone.

8. A method for treating liquid to remove material therefrom which comprises (a) feeding the liquid to a settling zone where sedimented soft sludge is separated therefrom, (b) passing the separated liquid from the settling zone, (c) feeding the soft sludge to a first zone of centrifugation, and there (d) separating it into an inner layer comprising cleaned liquid, and an outer layer comprising concentrated aqueous sludge, (e) continually separately discharging said cleaned liquid and said aqueous sludge, (f) continually feeding said discharged aqueous sludge to a freezing zone to freeze the same, and then (g) continually feeding said frozen aqueous sludge from said freezing zone to a thawing zone to thaw the same.

9. A method according to claim 8, further including the step of continually feeding said thawed aqueous sludge from said thawing zone to a second zone of centrifugation, and there (a) separating the same into an inner layer comprising further cleaned liquid, and an outer layer comprising concentrated solids, and (b) continually separately discharging said further cleaned liquid and said concentrated solids.

10. In a method for treating raw liquid to remove material therefrom which comprises (a) passing the raw liquid through a mixing zone, and there (b) mixing it with one or more additives, (c) feeding the resultant mixture to a settling zone where sedimented soft sludge is separated from the liquid, (d) passing said soft sludge from the settling zone to a first zone of centrifugation, and there (e) separating it into an inner layer comprising cleaned liquid and an outer layer comprising concentrated aqueous sludge, (f) continually separately discharging said cleaned liquid and said aqueous sludge from said first zone of centrifugation, (g) continually feeding said discharged aqueous sludge to a freezing zone to freeze the same, and (h) continually feeding said frozen aqueous sludge to a thawing zone to thaw the same.

11. A method according to claim 10, further including the step of (a) continually feeding said thawed aqueous sludge to a second zone of centrifugation and there (b) separating the same into an inner layer comprising further cleaned liquid, and an outer layer comprising concentrated solids, and (c) continually separately discharging said cleaned liquid and said concentrated solids from said second zone of centrifugation.

12. A method according to claim 10, further including the step of passing said separated liquid from said settling zone to a filtering zone to filter the same.

13. A method according to claim 11, further including the step of passing said separated liquid from said settling zone to a filtering zone to filter the same.

14. A method according to claim 11, further including the step of recycling said cleaned water separately discharged from said first zone of centrifugation to a point ahead of said settling zone.

15. A method according to claim 14 further including the step of recycling said further cleaned liquid separately discharged from said second zone of centrifugation to a point ahead of said settling zone.

16. Soft sludge treatment apparatus comprising a first centrifuge having a rotatably mounted solid wall bowl adapted to apply forces in the range of between 900 g and 3000 g on soft sludge delivered thereto, means for feeding said soft sludge to said first centrifuge, said first centrifuge being adapted to separate said soft sludge into an inner layer comprising cleaned liquid, and an outer layer comprising concentrated aqueous sludge, means for freezing said aqueous sludge, means for delivering said aqueous sludge from said first centrifuge to said freezing means, means for thawing said aqueous sludge, and means for delivering said frozen aqueous sludge from said freezing means to said thawing means.

17. Soft sludge treatment apparatus according to claim 16, further including a second centrifuge having a rotatably mounted solid wall bowl, means for delivering said thawed aqueous sludge from said thawing means to said second centrifuge, said second centrifuge being adapted to apply forces in the range of between 600 g and 3000 g on said thawed aqueous sludge delivered thereto, whereby said thawed aqueous sludge is separated into an inner layer comprising further cleaned liquid, and an outer layer comprising concentrated solids, and means for discharging said concentrated solids from said second centrifuge.

18. Soft sludge treatment apparatus according to claim 17 further including means for circulating a coolant through said freezing means to absorb heat from said aqueous sludge contained therein, and from said freezing means through said thawing means to release heat to said aqueous sludge contained therein.

19. Soft sludge treatment apparatus according to claim 18, further including means for settling sedimented soft sludge from a mixture, said soft sludge feeding means being operatively connected to said settling means whereby soft sludge is delivered from said settling means to said first centrifuge, and means for recycling said cleaned liquid from said first centrifuge to a point ahead of said settling means.

20. Soft sludge treatment apparatus according to claim 19, further including means for recycling said further cleaned material from said second centrifuge to a point ahead of said first centrifuge.

* * * * *